United States Patent [19]

Flynn et al.

[11] Patent Number: 5,222,224

[45] Date of Patent: Jun. 22, 1993

[54] SCHEME FOR INSURING DATA CONSISTENCY BETWEEN A PLURALITY OF CACHE MEMORIES AND THE MAIN MEMORY IN A MULTI-PROCESSOR SYSTEM

[75] Inventors: Michael E. Flynn, Grafton; Scott Arnold, Sutton; Stephen J. DeLaHunt, Harvard; Tryggve Fossum; Ricky C. Hetherington, both of Northboro; David J. Webb, Berlin, all of Mass.

[73] Assignee: Digital Equipment Corporation, Maynard, Mass.

[21] Appl. No.: 727,296

[22] Filed: Jul. 9, 1991

Related U.S. Application Data

[63] Continuation of Ser. No. 306,776, Feb. 3, 1989, abandoned.

[51] Int. Cl.$^5$ ............................................. G06F 12/08
[52] U.S. Cl. ............................. 395/425; 364/DIG. 1; 364/243; 364/243.4; 364/243.41; 364/243.44
[58] Field of Search ................................ 395/400, 425

[56] References Cited

U.S. PATENT DOCUMENTS

| | | |
|---|---|---|
| 3,889,237 | 6/1975 | Alferness et al. ............... 340/172.5 |
| 3,938,097 | 2/1976 | Niguette, III .................. 340/172.5 |
| 3,949,379 | 4/1976 | Ball ................................ 340/172.5 |
| 3,979,726 | 9/1976 | Lange et al. .......................... 364/200 |
| 4,136,386 | 1/1979 | Annunziata et al. ............... 395/425 |
| 4,141,067 | 2/1979 | McLagan ............................ 364/200 |
| 4,142,234 | 2/1979 | Bean et al. .......................... 364/200 |
| 4,195,340 | 3/1980 | Joyce ................................ 364/200 |
| 4,197,580 | 4/1980 | Chang et al. ....................... 364/200 |
| 4,277,826 | 7/1981 | Collins .............................. 364/200 |
| 4,282,572 | 8/1981 | Moore, III et al. ................ 364/200 |
| 4,370,710 | 1/1983 | Kroft ................................ 395/425 |

(List continued on next page.)

FOREIGN PATENT DOCUMENTS

| | | |
|---|---|---|
| 59143/86 | 1/1987 | Australia. |
| 0095589 | 12/1983 | European Pat. Off. . |
| 0165823 | 6/1985 | European Pat. Off. . |

OTHER PUBLICATIONS

C. K. Tang, "Cache System Design in the Tightly Coupled Multiprocessor System," *Proceedings of the National Computer Conference*, New York, Jun. 7-10, 1976, vol. 45, pp. 749-753.

(List continued on next page.)

Primary Examiner—Joseph L. Dixon
Assistant Examiner—Rebecca L. Rudolph
Attorney, Agent, or Firm—Arnold, White & Durkee

[57] ABSTRACT

A method for insuring data consistency between a plurality of individual processor cache memories and the main memory in a multi-processor computer system is provided which is capable of (1) detecting when one of a set of predefined data inconsistency states occurs as a data transaction request is being processed, and (2) correcting the data inconsistency states so that the operation may be executed in a correct and consistent manner. In particular, the method is adapted to address two kinds of data inconsistency states: (1) A request for a operation from a system unit to main memory when the location to be written to is present in the cache of some processor unit-in such a case, data in the cache is "stale" and the data inconsistency is avoided by preventing the associated processor from using the "stale" data; and (2) when a read operation is requested of main memory by a system unit and the location to be read may be written or has already been written in the cache of some processor—in this case, the data in main memory is "stale" and the data inconsistency is avoided by insuring that the data returned to the requesting unit is the updated data in the cache. The presence of one of the above-described data inconsistency states is detected in a SCU-based multi-processing system by providing the SCU with means for maintaining a copy of the cache directories for each of the processor caches. The SCU continually compares address data accompanying memory access requests with what is stored in the SCU cache directories in order to determine the presence of predefined conditions indicative of data inconsistencies, and subsequently executes corresponding predefined fix-up sequences.

4 Claims, 6 Drawing Sheets

U.S. PATENT DOCUMENTS

| | | | |
|---|---|---|---|
| 4,392,200 | 7/1983 | Arulpragasam | 340/200 |
| 4,410,944 | 10/1983 | Kronies | 364/200 |
| 4,424,562 | 1/1984 | Genma et al. | 364/200 |
| 4,424,564 | 1/1984 | Hinai | 364/200 |
| 4,426,681 | 1/1984 | Bacot et al. | 364/200 |
| 4,426,682 | 1/1984 | Riffe et al. | 364/200 |
| 4,445,174 | 4/1984 | Fletcher | 364/200 |
| 4,471,429 | 9/1984 | Porter et al. | 364/200 |
| 4,494,190 | 1/1985 | Peters | 364/200 |
| 4,500,958 | 2/1985 | Manton et al. | 364/200 |
| 4,503,497 | 3/1985 | Krygowski et al. | 395/425 |
| 4,525,777 | 6/1985 | Webster et al. | 364/200 |
| 4,543,626 | 9/1985 | Bean et al. | 364/200 |
| 4,622,631 | 11/1986 | Frank et al. | 364/200 |
| 4,654,819 | 3/1987 | Stiffler et al. | 364/900 |
| 4,658,356 | 4/1987 | Shiozaki et al. | 364/200 |
| 4,737,931 | 4/1988 | Ishii | 364/900 |
| 4,747,043 | 5/1988 | Rodman | 364/200 |
| 4,768,148 | 8/1988 | Keeley et al. | 364/200 |
| 4,775,955 | 10/1988 | Liu | 364/900 |
| 4,785,395 | 11/1988 | Keeley | 364/200 |
| 4,797,813 | 1/1989 | Igariashi | 395/425 |
| 4,847,804 | 7/1989 | Shaffer et al. | 364/900 |
| 4,853,846 | 8/1989 | Johnson et al. | 364/200 |

OTHER PUBLICATIONS

J. Archibald et al., "Cache Coherence Protocols: Evaluation Using a Multiprocessor Simulation Model," ACM Transactions on Computer Systems, vol. 4, No. 4, Nov. 1986, pp. 273-298.

Fossum et al., "An Overview of the VAX 8600 System," Digital Technical Journal, No. 1, Aug. 1985, pp. 8-23.

Troiani et al., "The VAX 8600 I Box, A Pipelined Implementation of the VAX Architecture," Digital Technical Journal, No. 1, Aug. 1985, pp. 24-42.

Levy and Eckhouse, Jr., *Computer Programming and Architecture, The VAX-11*, Digital Equipment Corporation, 1980, pp. 263-276, 296-303, 351-368.

G. Desrochers, *Principles of Parallel and Multiprocessing*, Intertext Publications, Inc., McGraw-Hill Book Co., 1987, pp. 68-71.

Smith, A. J., "Cache Memory Design: An Evolving Art," IEEE Spectrum Dec. 1987, pp. 40-44.

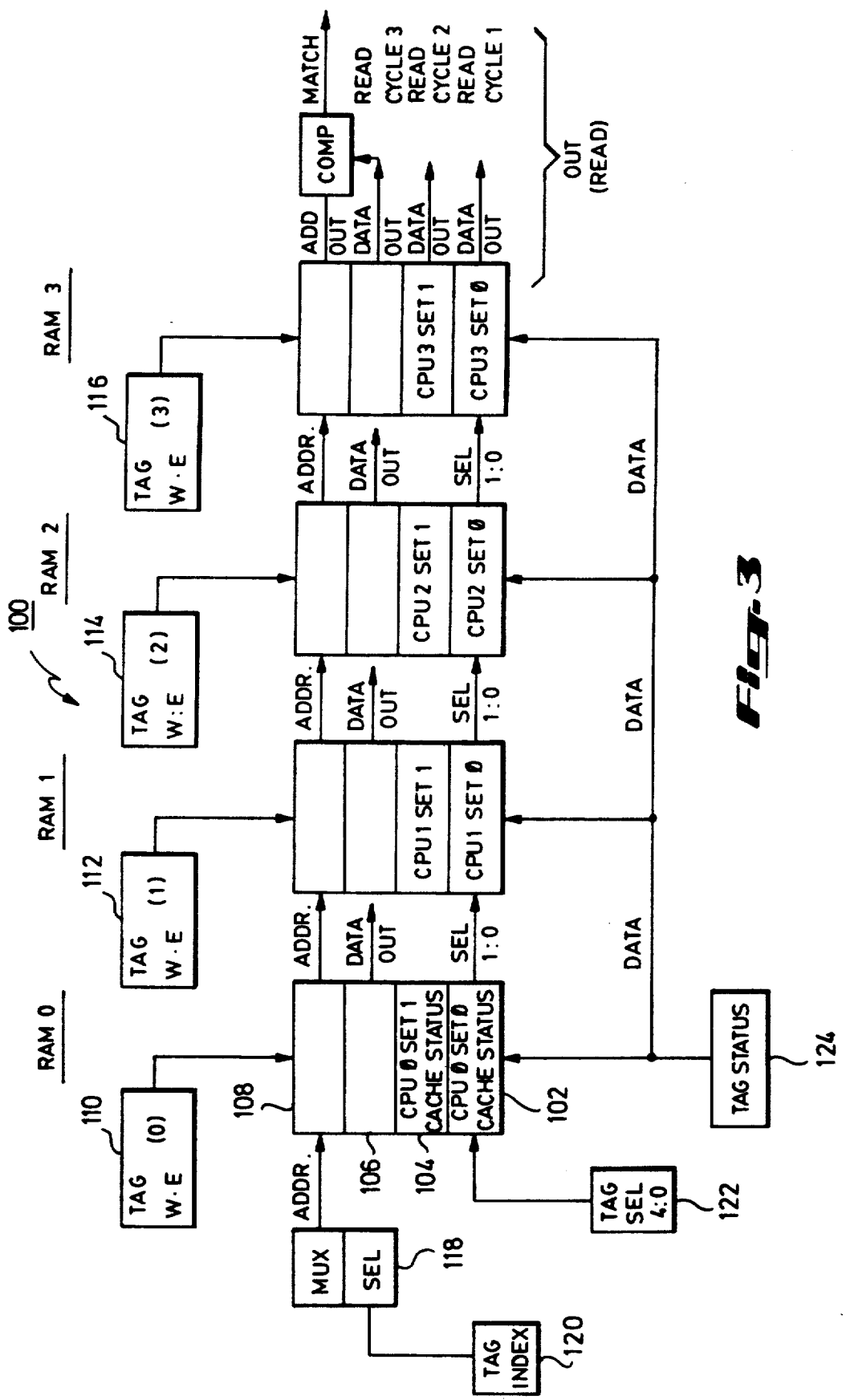

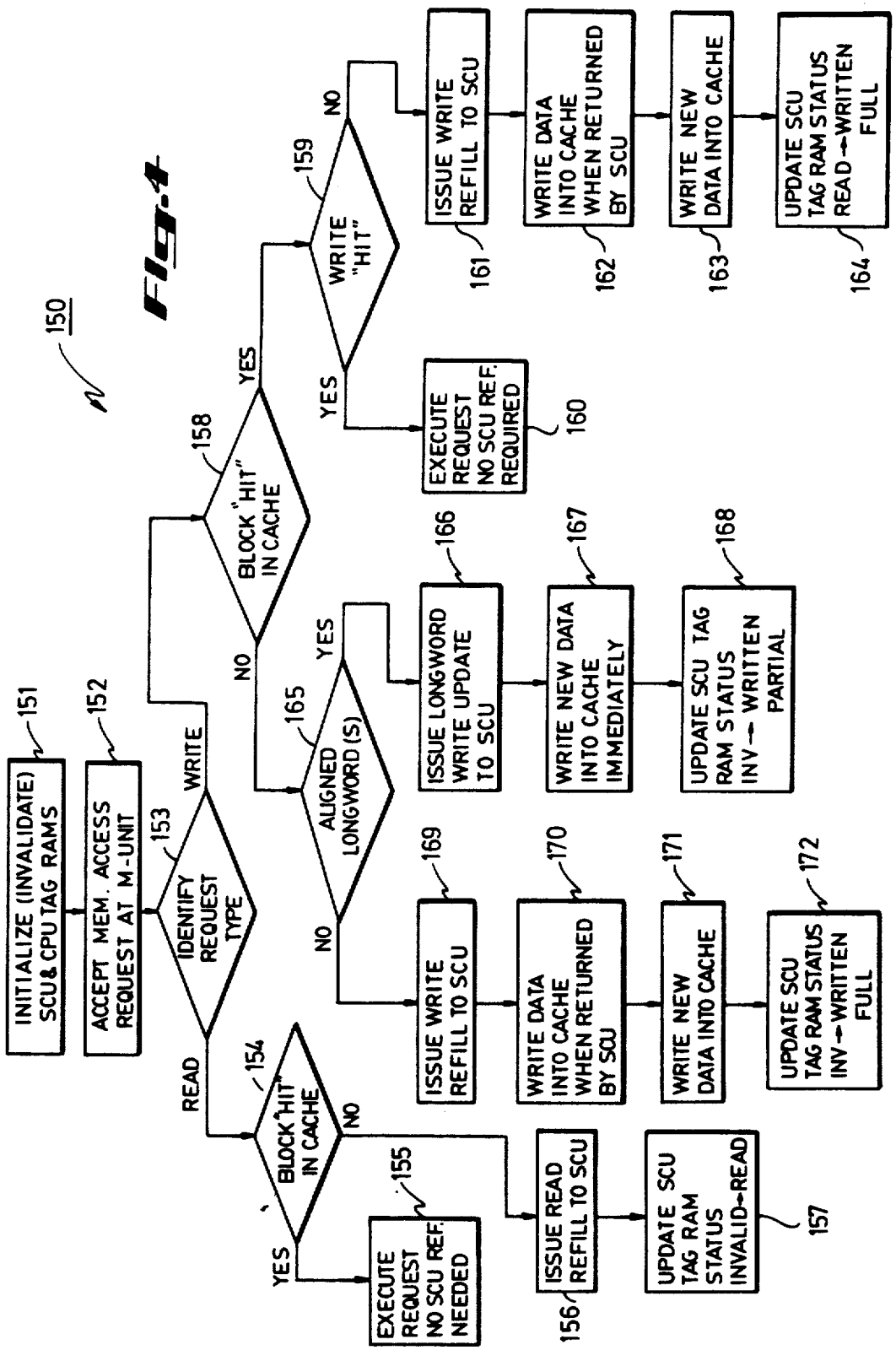

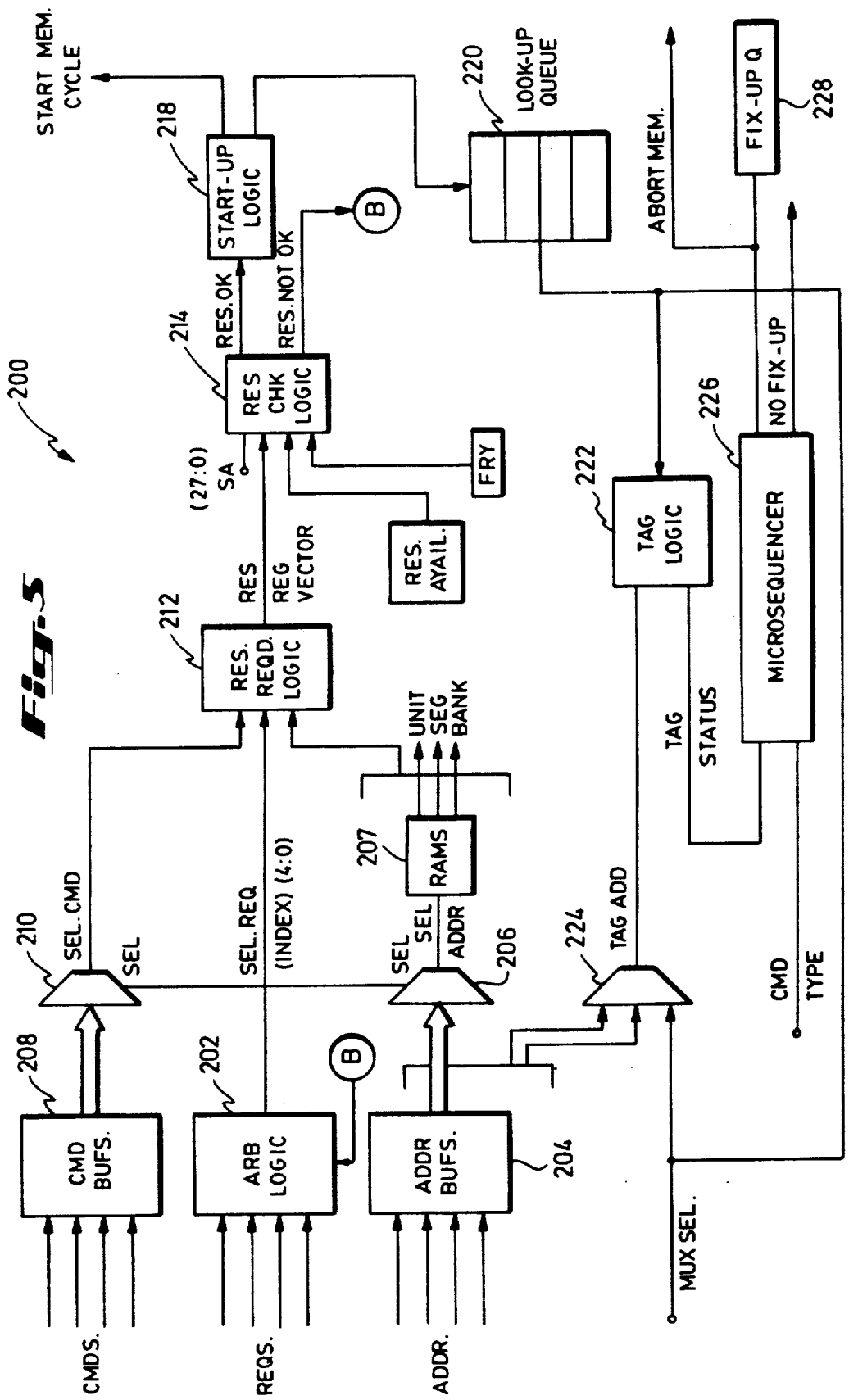

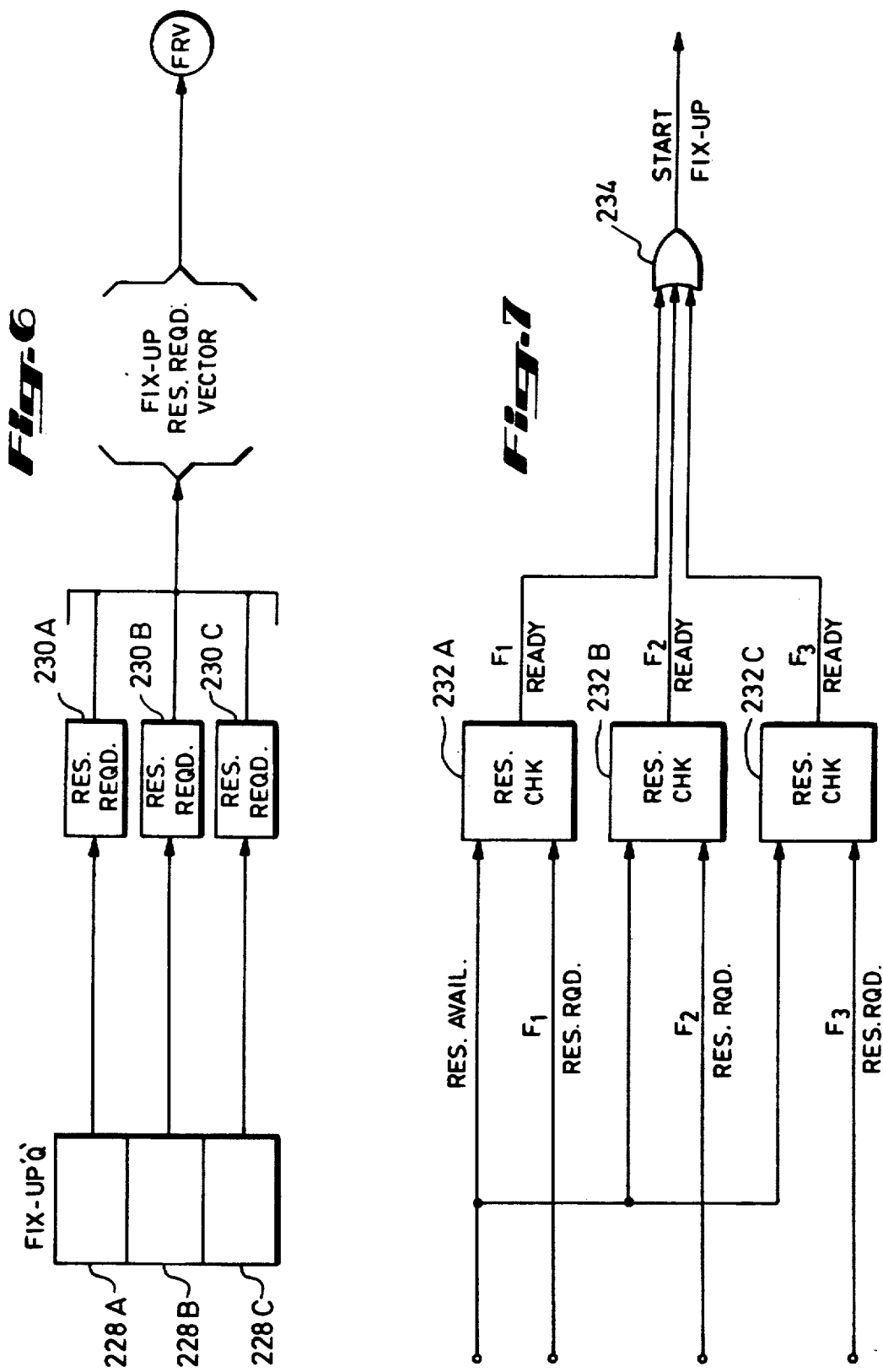

SCHEME FOR INSURING DATA CONSISTENCY BETWEEN A PLURALITY OF CACHE MEMORIES AND THE MAIN MEMORY IN A MULTI-PROCESSOR SYSTEM

This application is a continuation of application Ser. No. 07/306,776, filed Feb. 3, 1989 now abandoned.

BACKGROUND OF THE INVENTION

1. Related Applications

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989, and issued as U.S. Pat. No. 5,146,564 on Sept. 8, 1992; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989, and issued as U.S. Pat. No. 5,125,083 on Jun. 23, 1992; D. Fite et al., DECODING MULTIPLE SPECIFIERS IN A VARIABLE LENGTH INSTRUCTION ARCHITECTURE, Ser. No. 07/307,347 filed Feb. 3, 1989, and issued as U.S. Pat. No. 5,148,528 on Sept. 15, 1992; D. Fite et al., VIRTUAL INSTRUCTION CACHE REFILL ALGORITHM, Ser. No. 07/306,831 filed Feb. 3, 1989, and issued as U.S. Pat. No. 5,113,515 on May 12, 1992; Murray et al., PIPELINE PROCESSING OF REGISTER AND REGISTER MODIFYING SPECIFIERS WITHIN THE SAME INSTRUCTION, ser. No. 07/306,833 filed Feb. 3, 1989, and issued as U.S. Pat. No. 5,167,026 on Nov. 24, 1992; Murray et al., MULTIPLE INSTRUCTION PREPROCESSING SYSTEM WITH DATA DEPENDENCY RESOLUTION FOR DIGITAL COMPUTERS, Ser. No. 07/306,773, and issued as U.S. Pat. No. 5,142,631 on Aug. 25, 1992; Murray et al., PREPROCESSING IMPLIED SPECIFIERS IN A PIPELINED PROCESSOR, Ser. No. 07/306,846 filed Feb. 3, 1989, and issued U.S. Pat. No. 5,142,633 on Aug. 25, 1992; D. Fite et al., BRANCH PREDICTION, Ser. No. 07/306,760 filed Feb. 3, 1989, and issued as U.S. Pat. No. 5,142,634 on Aug. 25, 1992; Fossum et al., PIPELINED FLOATING POINT ADDER FOR DIGITAL COMPUTER, Ser. No. Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989, and issued as U.S. Pat. No. 5,107,462 on Apr. 21, 1992; Beaven et al., METHOD AND APPARATUS FOR DETECTING AND CORRECTING ERRORS IN A PIPELINED COMPUTER SYSTEM, Ser. No. 07/306,828 filed Feb. 3, 1989, and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989, and issued as U.S. Pat. No. 5,155,854 on Oct. 13, 1992; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989, and issued as U.S. Pat. No. 5,067,069 on Nov. 19, 1991; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,564 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989, and issued as U.S. Pat. No. 5,155,854 on Oct. 13, 1992; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989, and issued as U.S. Pat. No. 5,043,874 on Aug. 27, 1991; Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, now abandoned; Hetherington et al., METHOD AND APPARATUS FOR INCREASING THE DATA STORAGE RATE OF A COMPUTER SYSTEM HAVING A PREDEFINED DATA PATH WIDTH, Ser. No. 07/306,826 filed Feb. 3, 1989, and issued as U.S. Pat. No. 5,019,965 on May 28, 1991; and Hetherington et al., METHOD AND APPARATUS FOR ORDERING AND QUEUING MULTIPLE MEMORY REQUESTS, U.S. Ser. No. 07/306,870 filed Feb. 3, 1990.

2. Field of the Invention

This invention relates generally to cache-based multi-processor systems. More particularly, this invention relates to an improved technique for insuring data consistency between the main memory and the individual processor cache memories in a multi-processor computer system.

3. Description of the Related Art

Cache memories are commonly used in high-performance computer systems in order to optimize the ratio of system memory to processor speed. Typically implemented in the form of small, high-speed buffer memories, caches continually obtain and temporarily retain data (typically, the most recently used instructions and data items) that associated system processors are likely to require in executing current operations. The main memory of a computer system is generally accessed in a logical order and often in a sequential fashion. Typical examples include the processing of array structures and the sequencing of instructions in executing a particular program. Alternatively, a program may repeatedly execute an instruction loop prior to transferring control to a localized area. In both these cases, a substantial increase in the execution speed of the individual processes, and consequently the overall computer system, can be achieved if an auxiliary memory is provided which is capable of retaining sufficient data to avoid repeated references to the slower system memory; caches associated with system memory provide this function.

In typical cache implementations, the cache memory resides between a processor and the system memory (the primary or main memory). Memory addresses are interpreted by using an associative memory map which defines a correspondence between requested address locations and the cache contents. If a requested data item exists within the cache, requests to main memory are inhibited by the associative memory and the desired data is supplied from the cache to the requesting processor. The system memory is accessed only when a requested data item is not located within the cache; in such a case, the required data is fetched from the system memory and then supplied to the requesting processor. The operation of such cache memory schemes is based upon the phenomenon of locality exhibited by programs in the generation of addresses and memory usage. In essence, cache memories provide a window into the system memory for associated processors and permit high-speed access to data references with both spatial and temporal locality.

However, because caches duplicate data items that exist in the system memory, it is critical that data consistency be maintained between the system memory and the various cache memories of the system. When individual processors are provided with separate, individual cache memories, the caches may hold different versions of shared data and steps must be taken to update all such differing versions. In addition, when a particular processor modifies information within its cache, the revised information needs to be replaced in the main memory in order that the various caches and the main memory always hold valid copies of stored data.

Cache consistency has been approached through several techniques, including the use of "smart" memories, and the more popular software control. Bus-based consistency schemes, for instance, utilize a common path to main memory which is shared by all system processors and is premised on the detection of data inconsistencies by making each cache maintain an updated directory of transactional data information by monitoring, via a common bus, misses and writes-to-memory by all other caches. The common bus approach, in addition to being fairly complex and requiring special VLSI chips, is operable only with a limited number of processors because of bottleneck problems arising from the transfer of extended amounts of data over the shared bus.

Software-controlled consistency schemes are increasing being used in multi-processor systems and are predicated on the use of system-controlled microcode which tracks the areas of memory that are shared and relays commands to the various processor caches to make sure that shared data is kept consistent. The commands could, for example, initiate the purging of a processor cache if shared memory is found to have been modified by another processor. In these schemes cache synchronization is critical and it is possible for system speed to be unduly restricted if the purging of processor caches is required too often.

The two most commonly employed techniques in cache consistency schemes are the "write-back" method and the "write-through" method. With the write-back method, modified or new data is written only to individual caches and not to main memory. Each cache tag has associated with it an additional bit that is set whenever the associated cache entry is modified. When the modified data is to be replaced in the cache, its value is written back to the main memory only if the identifying bit is found to have been set. While this method is quite efficient because it requires writing to main memory only when data items within individual caches are modified, it does require continual monitoring and updating of memory resident data and can be problematic when the main memory is shared among several processors. The problems are exacerbated in systems where processors are permitted to write to segments of caches without refilling from main memory the complete block containing the segment being written.

With the write-through method, data consistency is insured by immediately propagating all cache writes to main memory and by provision of a shared processor-cache interface that is accessible to all system processors. However, this method can result in a substantial deterioration of cache performance because unnecessary writes to main memory are required if a plurality of writes occurs consecutively.

A common problem associated with most conventional cache consistency schemes is that the acceptance of data transaction requests is contingent on the current status of shared memory. In other words, an incoming data request from a processor or other system unit is not accepted or executed unless it is established that the request will not generate data inconsistencies. This restriction can be quite limiting in high-performance systems where it is essential that all incoming process requests be scheduled for execution regardless of whether or not a particular request could cause an inconsistency between data shared by the processor caches and the main memory.

SUMMARY OF THE INVENTION

Briefly, in accordance with the system of this invention, an improved cache consistency scheme is provided which is capable of: (1) detecting when one of a set of predefined data inconsistency states occurs as a data transaction request is being processed, and (2) correcting the data inconsistency so that the operation may be executed in a correct and consistent manner.

According to a preferred embodiment, the cache consistency scheme of this invention is adapted to focus on two kinds of data inconsistency states: (1) a request for a write operation from a system unit to main memory when the location to be written to is present in the cache of some processor unit (in this case, data in the cache is "stale" and the associated processor must be prevented from using the stale data); and (2) when a read operation is requested of main memory by a system unit and the location to be read may be written or has already been written in the cache of some processor (in this case, the data in main memory is "stale" and the data returned to the requesting unit must be the updated data from the cache).

The cache consistency scheme is particularly adapted for use in a multi-processing system which has a system control unit (SCU) for coordinating the parallel operation of the plurality of central processing units (CPUs) comprising the processing system in conjunction with the main system memory, I/O devices, and other components of the computing system. One of the main functions of the SCU is to manage memory access in a manner which most efficiently allows all system units to function in parallel. In accordance with one aspect of this invention, the presence of one of the above-described data inconsistency states is detected in a SCU-based multi-processing system by providing the SCU with means for maintaining a copy of the cache directories for each of the processor caches. Each time a request is processed by the SCU, the address data is compared with what is stored in the directories in order to determine the presence of a match. The directory contains the physical address of the memory data in the cache location as well as an additional status bit indicative of whether or not the data has been written in the cache without the main system memory having been updated. In the case of write operations, when a match is found, i.e., a write-to-memory "hits" a location in a cache, the SCU is adapted to execute a predefined fix-up sequence. If the write status bit is not set, the SCU relays a command to the processor in question to invalidate the cache location. However, if the write status bit is set, the SCU commands the processor to first write the data back to main memory and then invalidate its cached copy.

An added complication exists in computer systems where processor units are allowed to write to segments of a cache block without refilling the whole block from main memory. As a result, partially valid cache blocks may exist. When these blocks are written back to main memory or sent to another processor in response to a cache refill request, it becomes necessary to appropriately merge the segmented data. The cache consistency scheme of this invention is adapted to detecting the existence of such a state and, in response thereto, performing the required merge operation in a buffer provided at the front end of the memory system.

In an illustrative embodiment of the improved cache consistency scheme, an SCU-based multi-processor system is adapted for operation with 64-byte-write cache blocks and processors are permitted to write to selected longword within a cache block without a refill from main memory. The SCU ascertains the occurrence of such an event and marks its cache directory accordingly, and subsequently checks the other cache directories to determine if the particular cache block needs to be invalidated in the caches of the other processors. When the request has been processed, the SCU relays a response to the original requesting processor. The present scheme allows a requesting processor to proceed with its operation without waiting for the response from the SCU unless the SCU determines that the requested operation is a write to a cache block in a different CPU. If a different cache block is in fact involved, the requesting processor is forced to wait for the SCU response before proceeding further; this insures that memory writes occur in the same order seen by other system processors.

Also according to this invention, memory refill operations are processed as two separate transactions, the first occurring when the SCU honors an incoming data transaction request from a processor, and the second occurring when the SCU subsequently receives a request from memory to relay requested data to the processor. Checks for the existence of data inconsistency states and other conflicts are made on each transaction and, thus, the SCU is free to process other data requests during the interim period. With such a scheme, the SCU is required to execute the fix-up sequence of data transactions only if a cache conflict is detected. Preferably, the correction of data inconsistencies is performed under microcode control so that the correct sequence of execution can be controlled with use of minimal hardware.

BRIEF DESCRIPTION OF THE DRAWINGS

Additional objects and advantages of the invention will become apparent upon reading the following detailed description and upon reference to the drawings in which:

FIG. 3 is a diagram illustrating the global tag structure provided within the SCU for maintaining the cache status of the CPUs;

FIG. 4 is a flowchart illustrating the sequential procedure involved in processing memory access requests both at the CPU level and the SCU level; and FIGS. 5-7 are schematic diagrams of a preferred hardware implementation adapted for use with the cache consistency scheme of this invention.

Figure 1:
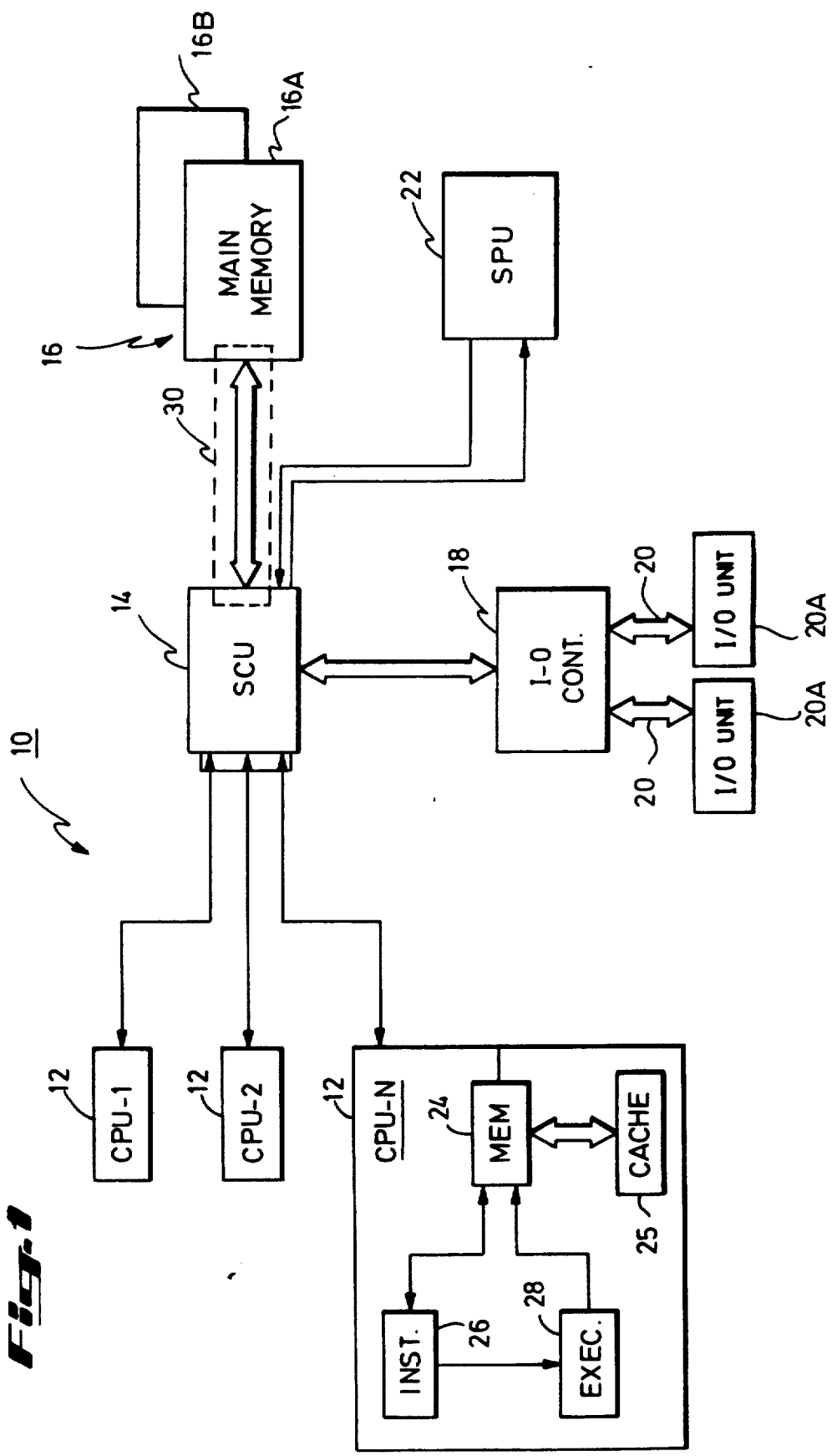
FIG. 1 is a block diagram of a multi-processing system in which a plurality of system CPUs are operated in parallel and share the main memory of the system.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a block diagram of a multi-processor system 10 which uses a plurality of central processing units (CPUs) 12 and is configured to permit simultaneous, i.e., parallel operation, of the system CPUs by allowing them to share a common main memory 16 for the system. The main memory 16 itself typically comprises a plurality of memory modules or units 16A and 16B. A system control unit (SCU) 14 links the CPUs 12 to the main memory 16 and to the input output (I/O) controller 18 which allows the processing system in general and the CPUs in particular to communicate with the external world through appropriate I/O interfaces 20 and associated I/O units 20A for the system. The SCU 14 also links the various system modules to a service processor/console unit (SPU) 22 which performs traditional console functions including status determination and the control of the overall operation of the processing system. In particular, the SCU 14 provides the SPU 22 with means for communicating with the plurality of CPUs 12 and provides access to all storage elements in the CPUs.

Efficient communication between all system units ported into the SCU 14 and the main memory 16, and more particularly, between each of the CPUs 12 and the main memory 16, is important for ensuring efficient parallel operation of the processing system. This operation is provided by means of a dedicated interface means 30 linking the SCU 14 and the main memory 16. The interface 30 provides the SCU 14 with means for interfacing and controlling the various modules comprising the main memory 16 in response to memory interaction commands or signals received from each of the CPUs 12 or I/O units 20A that are ported into the SCU.

As also shown in FIG. 1, each CPU 12 typically includes a memory unit (M-Unit) 24 which provides the CPU interface to memory, I/O and other CPU units. In particular, the M-unit modules serves as means for accepting memory references, usually virtual, translating the references to physical addresses, and initiating accesses to memory data, either in main memory through the SCU 14 and the interface means 30, or more importantly, within a local cache associated with the CPU. The illustrative system of FIG. 1 is representative of a pipelined virtual memory-based computer system. In accordance with the concept of pipelining, the CPU 12 is a non-homogeneous processor which includes a set of special-purpose functional units dedicated to and optimized for performing specific tasks into which individual instructions are split prior to execution. Thus, each CPU 12 also includes an instruction unit (the I-Unit) 26 for fetching instructions, decoding operation codes (op-codes) and specifiers, fetching operands, and updating the system program counter and an execution unit (the E-Unit) 28 which serves as the execution stage for decoded instructions and fetched operands provided by the other CPU modules. In a practical implementation of such a system, up to four CPUs are operated simultaneously in parallel by efficiently sharing the main memory 16 under control of the SCU.

In FIG. 1, the M-Unit 24 for each CPU 12 includes a main cache 25 which permits the I- and E-Units 26 and 28, respectively, to access and process data at a much faster rate than permitted by the normal access time of the main memory 14. The main cache 25 temporarily retains data (typically, the most recently used instructions and data items) which the processor is likely to require in executing current operations. The cache interprets memory addresses by using an associative memory map which defines a correspondence between requested address locations and cache contents. The system operates by inhibiting requests to main memory and supplying data requested by the processor from the cache if the requested data item is found to exist within the cache. The main memory 16 is accessed, through the SCU 14, only when a requested data item is absent from the cache 25, in which case the data is fetched from the system memory and then supplied to the requesting unit. The cache 25 operates on the phenomenon of locality in computer programs and provides a window into the system main memory 16 and permits high-speed access to data references with both spatial and temporal locality.

The cache 25 on an average basis enables the CPU 12 to process data at a faster rate than the access time of the main memory 16. The cache 25 typically includes means for storing selected predefined blocks of data elements and along with the M-Unit 24 forms means for receiving requests from system units to access specified data elements, means for checking whether the data element is in a block stored in the cache, and means operative when data for the block including a specified data element is not so stored, for requesting, through the SCU, the specified block of data from the main memory 16 and storing the block of data in the cache 25.

In other words, the cache provides a "window" into the main memory, and contains data likely to be needed by the CPU 12. If a data element needed by the CPU 12 is not found in the cache 25, then the data element is obtained from the main memory 16, but in the process an entire block, including additional data, is obtained from the main memory 16 and written into the cache 25. Due to the principle of locality in time and memory space, the subsequent times that the CPU desires a data element, chances are that this data element will be found in the block which includes the previously addressed data element. Therefore, chances are that the cache 25 will already include the data element desired by the CPU. In general, since the cache 25 will be accessed at a much higher rate than the main memory 16, the main memory 16 can have a proportionally slower access time than the cache 25 without substantially degrading the average performance of the CPU. Therefore, the main memory 16 can be, and generally is, comprised of slower and less expensive memory elements.

Exemplary designs for the cache 25 and main memory 16 that are similar to the cache and main memory of a "VAX-11" digital computer are described in Chapter 11 of Levy and Eckhouse, Jr., Computer Programming and Architecture—VAX-11, Digital Equipment Corporation (1980) pp. 351-368, herein incorporated by reference. Such "VAX" brand digital computers are commercially available from Digital Equipment Corporation, 111 Powdermill Road, Maynard, Mass. 01754-1418.

The main memory 16 preferably has a segment based organization of the type described in detail in the Gagliardo et al. application referenced above entitled Method And Means For Interfacing A System Control Unit For a Multi-Processor System With The System Memory. As described therein, the main memory 16 includes at least one main memory unit (MMU) formed of four (4) extended hex-size memory modules, each preferably providing 64 megabits (M-bits) of storage using a one M-bit DRAM. All CPU accesses to or from memory are made through the SCU 14 (FIG. 1) in block increments comprising a selected number of bytes (typically 64 bytes).

Figure 2:
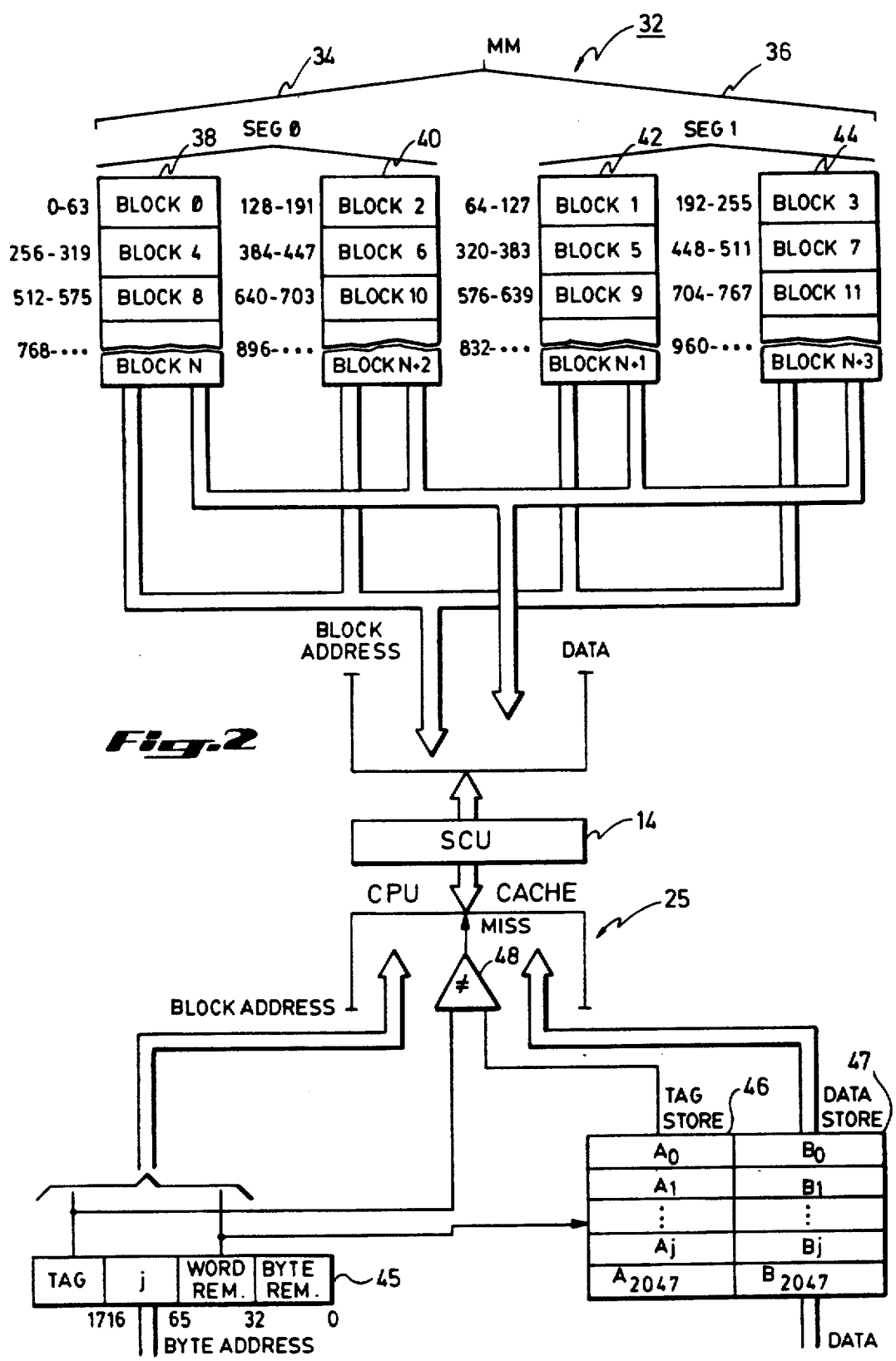
FIG. 2 is a block diagram illustrating the structural arrangement of the interleaved segments of main memory as well as the CPU cache and the manner in which the two are linked.

Referring now to FIG. 2 there is shown a block diagram of the preferred organization of a CPU cache 25 and the storage section of the main memory 16. As shown therein, the data storage section of a MMU in the main memory 16 comprises a pair of segments 34,36 each of which comprises a pair of memory banks. The four memory banks are respectively designated as 38, 40, 42 and 44. The memory banks are DRAM based and may each store, for example, 64 Megabytes of data. Although the general organization of such a segment-based memory is conventional, it is important that the memory addresses for the memory banks be interleaved on block boundaries. Such an arrangement is illustrated in FIG. 2 wherein interleaving is shown for a preferred data block size of 64 bytes. A first block (BLOCK 0) has byte addresses 0-63 associated with it and is stored in the first bank 38 on the first memory segment 34; the next consecutive block comprising byte addresses 64-127, i.e., the second block (BLOCK 1), is stored in the first memory bank 42 of the second memory segment 36; the third block (BLOCK 2) having byte addresses 128-191 associated with it is stored in the second memory bank 40 of the first memory segment 34; the fourth memory block (BLOCK 3) has byte addresses 192-255 associated with it and is stored in the second memory block 44 of the second memory segment 36; the fifth block (BLOCK 4) has byte addresses of 256-319 associated with it and is stored in the first memory bank 38 of the first memory segment 34; and so on.

As also shown in FIG. 2, the cache 25 includes an input address register generally designated as 45, a tag store generally designated as 46, and a data store generally designated as 47. The data store 47 is organized for storing selected ones of the predefined blocks of the data elements. In order to indicate whether data for a specified block are stored in the data store 47, the tag store 46 is organized for storing respective tags associated with the blocks. The cache 24 further includes means such as a comparator 48 for checking whether data for a specified block is stored in the cache memory.

As specifically shown in FIG. 2, the tag comprises the upper portion of the block address. In response to a fill request, an addressed block in the main memory is transferred to one or more predefined slots in the data store 47. The slots associated with a given block are indexed by an index j. The index j and the tag for a particular block specify the block address for that block. Therefore, when an address of a desired byte is received in the input register 45, the index portion j points to at least one corresponding slot in the tag store 46 and the addressed tag is fed to the comparator 48 for comparison with the tag specified by the byte address.

If the comparator 48 detects coincidence, a "hit" is indicated signalling that the desired byte is included in the block in the data store 47 which is indexed by the index j. Otherwise, the comparator 48 indicates a "miss" and causes a corresponding fill request to be placed with the SCU. The fill request is then transmitted to the corresponding one of the four memory banks 38-42 which stores the blocks specified by the block address from the input register 45.

As further illustrated in FIG. 2, the tag store 46 and data store 47 preferably include 2048 different slots or two separate banks of 1K separate different slots each, which are specified by an index j having eleven binary bits. These binary bits are located at bits 6 to 16 of the byte address. The bits 0-5 of the byte address specify the particular position of the byte in the block addressed 45. Typically each data element includes eight contiguous bytes forming a "quad word." The position of the byte in a quad word is specified by a "byte remainder" including bits 0-2 of the byte address. The position of the quad word in a block is indicated by a "quad word remainder" specified by bits 3-5 of the byte address.

FIG. 3 is an illustration of a preferred structure for the global cache tag directory defined within the SCU for maintaining the cache status of the plurality of CPUs comprising the multi-processing system of the type shown in FIG. 1.

As shown in FIG. 3, the global tag structure 100 includes four (4) separate RAM structures designated as RAM 0, RAM 1, RAM 2, and RAM 3 which corresponds to the caches in the corresponding CPUs CPU 0, CPU 1, CPU 2, and CPU3. Each RAM structure is dedicated to one CPU and, according to a preferred implementation, has a capacity of four kilobytes (4K) so that four separate 1-K sections may be defined. The first section 102 holds the Set 0 status for the CPU while the second section 104 holds the Set 1 status. The third and fourth sections 106, and 108, respectively are not required for the tag directory and are, hence, left unused. However, the unused RAM sections can be advantageously use for other productive purposes. The sections may particularly be useful for maintaining other reference directories, such as lock directories, which need to be frequently accessed by the SCU. Reference is hereby made to co-pending Arnold et al. U.S. patent application Ser. No. 07/306,541 filed Feb. 3, 1989 entitled "Synchronizing And Processing Of Memory Access Operations In Multi-processor System", also owned by the assignee of the present invention, which discloses the use of one of the unused RAM sections in the global tag structure 100 for maintaining a lock directory and an associated reserve list for ensuring conflict-free processing of memory access transactions involving lock requests.

Returning to FIG. 3, Write-Enable (W.E.) lines 110, 112, 114, and 116 are provided for enabling the writing of tags corresponding to the four RAM structures RAM 0-3. Memory addresses accompanying access requests are directed through a multiplexer arrangement 118 which has its 'select' input enabled by the tag index 122 to pick out the memory address for which the cache status is required. A tag 'select' signal 122 is used to pick between the cache status for Sets 0 and 1, respectively, of a particular CPU. In FIG. 2, only one set of RAMs are shown for each RAM structure. In actuality, a plurality of RAMs are typically provided for each RAM structure. In the illustrative embodiment of FIG. 1, for instance, six RAMs are provided for each RAM group. A 3-bit tag 'status' input 124 is also provided to each of the RAM structures and the cache status is sequentially read out in consecutive read cycles as output data while the corresponding memory addresses are also generated at the output. These addresses pass through a comparison unit to determine if there is a match between the memory address corresponding to a memory access request and the contents of the corresponding cache block.

It is significant that the global tag structure described above is particularly adapted to the maintenance and read-out of the status of cache blocks within individual CPUs. Typically, the cache status indicates whether a particular cache block contains data which is either invalid, read, written partial, or written full.

The SCU monitors the status of each CPU cache and maintains the status of the caches by adjusting the status bits accordingly. The cache tag directory thus provides the SCU with a convenient means for ascertaining the cache status of both the requesting unit and the target unit for a given memory access transaction. The SCU merely has to perform an address comparison to determine if a block of memory exists within a CPU cache. Further, by reading the tag status corresponding to an addressed block, the SCU can quickly determine whether data existing in the block is either invalid, read, written- partial, or written-full. Since all memory transactions must necessarily flow through the SCU, the cache tag directory of the SCU serves as a fool-proof means for maintaining the current cache status for every CPU. Using this information, it becomes possible for the SCU to detect and correct data inconsistency states, as will be explained below in detail.

Referring now to FIG. 4, there is shown a flowchart illustrating the sequence of events involved in the initial processing of a memory access request in accordance with the cache consistency scheme of this invention. The procedure is initiated by initializing the tag RAMs associated with both the SCU and the CPU by setting them to an "invalid" state. This initialization occurs at step 151. Subsequently, at step 152, the memory access request generated by a CPU is accepted at the corresponding M-Unit. At the following step 153, a determination is made as to whether the request is for a read operation or a write operation. If the request is for a read, step 154 is accessed where a determination is made as to whether or not the memory address associated with the request corresponds to a block "hit" within the CPU cache, i.e., the CPU cache is checked to see if the memory address is located within the block of memory in the cache.

If there is a block "hit", step 155 is accessed where the request is executed directly since no SCU reference is needed. In other words, the M-Unit responds to the requesting port by supplying it with the requested data from within its cache. However, if the answer at step 154 is in the negative, i.e., there is no block "hit" within the cache, step 156 is accessed and the M-Unit issues a read refill request to the SCU in an attempt to obtain the requested read data from the main memory. Subsequently, at step 157, the SCU tag RAMs have their status changed from the original invalid state for the entry corresponding to the read refill request to that of a read entry.

At the completion of 157, it should be noted that the event that causes the status of the tag RAMs to be changed from that of an invalid entry to a read entry is the action of the SCU in fetching the required data from memory and sending it to the cache of the requesting CPU. At this point, the corresponding entry in the SCU cache tag directory is marked as having a read entry. Subsequently, if any other CPU makes a reference to that data, it can be ascertained that the CPU retains that data within its cache only for read purposes. This arrangement can be advantageous in later directing the CPU to invalidate the contents of its cache if the same locations in memory are written to by some other CPU. It is for such subsequent fix-up operations that the cache tag status becomes critical.

If the decision at step 153 indicates that the request being processed is a write request, step 158 is accessed where a check is made to see if the addressed memory location exists within the CPU cache, i.e., it is determined whether or not there is a block "hit" in the cache. If such a "hit" is found to be absent, step 159 is accessed.

If it is found at step 158 that there is a block "hit" within the CPU cache, step 159 is accessed where a check is made to see if the corresponding write bit for the block is set. If the answer to this question is yes, it is an indication that the M-Unit would be writing to a block to which it already has write authorization from the SCU. Accordingly, from the point of view of the SCU, no SCU reference is required and the memory accessed request can be executed by writing to the block of memory in the CPU cache. However, if it is found at step 159 that the block "hit" within the cache does not have its write bit set, it is an indication that the CPU had previously fetched the memory block with read intent only and, accordingly, has no authorization to write to that block. At this point, the M-Unit issues a write refill request to the SCU at step 161.

At step 162, the requested write data is received from the SCU subsequent to an access into the main memory. To the SCU, this means that the data being returned and stored into the cache of the requesting CPU is capable of being written to. Subsequently, at step 163, the CPU writes new data on top of at least part of the data received from the SCU. Next, step 164 is reached where the status of the SCU tag RAMs is updated and transformed from the previous read entry to that of a written-full entry. At this point, the cache block, which previously was only a read block, has its status changed to indicate that the block now has data written-full within it. Since the previously read authorized block of data has been written over by the new data, the status of the SCU tag RAMs is adjusted to indicate that this block of written data is completely valid.

If the M-Unit is processing a write request and the decision at step 158 indicates that there is no block "hit" within the cache, i.e., there is a block "miss", a determination is made at step 165 as to whether or not the words to be written to memory are aligned longword or not. The identification of a long word is significant because preferably only a single valid bit is provided per longword. According to this arrangement, if the M-Unit has to write to a particular byte, the whole of the block containing the particular byte has to be fetched from main memory and one or more of the bytes within the fetched block must be replaced by the new byte of data. This is because when the M-Unit does a refill from memory it gets all the data from memory and puts it into the cache; since the whole block is valid, all the valid bits are set. If the M-Unit has to write a byte, the longword containing the byte is selected, and the old value of that byte is written over by the new value, while retaining all the valid bits as being set so that the complete block remains valid. This sequential procedure has to be followed when the CPU has to write something which is not in the form of an aligned longword, such as a byte or a longword which is not aligned on the longword boundary.

If the M-Unit has a cache miss, but what is being Written is either an aligned longword or multiples of aligned longwords, there is no need to actually fetch the data from memory. Instead, the CPU can start with what effectively is an empty block. The SCU starts with an empty location within the cache, writes the longword into that location and only sets the valid bit corresponding to the longword at issue. Under these conditions, the SCU designates the block as being written-partial, meaning that not all the longwords within the block are valid. In any case where the amount of data being written is not all of a complete longword, this mechanism breaks down and the system has to resort to a write-refill mechanism and refill the whole block from the main memory. In practical terms, the write refill request requires the whole block to be fetched from memory, an operation which is very time consuming. In the case of aligned longwords, the M-Unit continues with its operational cycle without having to wait for the requested data to be brought in from the main memory. Accordingly, the best performance is obtained when memory references involve aligned longwords of memory.

Returning now to FIG. 4, if the test at step 165 indicates that the memory reference involves one or more aligned longwords, the M-Unit sends to the SCU, at step 166, a longword write update. In the subsequent step 167, the M-Unit writes the new data into its cache immediately. Next, at step 168, the corresponding single or multiple longword valid bit is set. At the same time, the SCU tag RAMs have their status changed from that of an invalid entry to a written-partial entry. This is an indication to the SCU that not all the longwords are valid within that block.

If the test at step 165 indicates that the longword being referenced is not an aligned word, step 169 is accessed and the M-Unit issues a write refill request to the SCU at step 169. When the requested data is returned by the SCU, the data is written into the CPU cache at step 170. Subsequently, at step 171 the new data is written over the write data returned earlier by the SCU from main memory. Upon processing of the write refill request, the SCU tag RAM status is changed from an invalid state to a written-full state. This updating of the SCU tag RAMs occurs at step 172. Thus, even though a full block was returned from main memory by the SCU and was subsequently partially overwritten within the cache, the complete block of data within the CPU cache is valid at this point.

It should be noted that in terms of the main memory itself, there is no distinction between a read refill request and a write refill request. The difference occurs at the SCU stage where the status of the tag RAMs is maintained as either in a read or write state and this distinction is important to in determining cache consistency conflicts. The above description provided in conjunction with the flowchart of FIG. 4 defines the basic flow of events determined by the status of the cache within the M-Unit (read/write, block "hit", etc.,). Each of the different options resulting from the various cache states results in a corresponding command being relayed to the SCU and the receipt of these commands determines the action taken upon the SCU tag RAMs.

Preferably, a 2-bit code is used for designating the status of the SCU tag RAMs. More specifically, a code of "00" represents an "invalid" status, a code of "01" represents a "read" status, a code of "10" represents a "written-partial" status, and a code of "11" represents a "written-full" status. It should be noted that in the 2-bit field designating the tag status, the assignment of a value "1" signifies the "written" nature of the corresponding bit.

The written-partial operation, when used for transfer of data between co-processing units involves two memory cycles, one for the SCU to write specified data into the corresponding memory location and another cycle for subsequently reading out the written data from the same location in memory to be relayed to the target processor. In comparison, the written-full operation only requires a single memory cycle since the data that has to be written to memory is exactly the same data that has to be subsequently relayed to the target processor. Accordingly, the SCU need not store the data in memory by going through a write operation and then retrieve it by a read operation; instead, what is termed to be a "write-pass" operation is utilized wherein the SCU initiates the writing of the data to memory and in the same cycle relays the same data on to the target processor.

Thus, although memory access requests may be processed by considering all writes to be of the write partial kind, the distinction between the written-partial and the written-full operations allows critical memory access cycles to be conserved. Consider the case, for instance, where the activity of one processor causes data with written-full or written-partial status data within its cache to be required by another processor. If the data within the target CPU is written-partial, the data within the target CPU is not completely valid as a full block and the SCU is not in a position to determine which of the longwords in that block are valid. But, since the CPU requiring the refill request must have a completely valid block, the SCU has to ensure that the target CPU writes the data back to memory and then fetch the data out of memory to satisfy the refill request of the first processor. This sequence has to occur for all cases where data is partially written; however, if data is written full, the storage of data in memory can be bypassed because the full block of data in the target CPU is valid and maybe directly relayed by the SCU to satisfy the refill request. Thus, only a write-pass operation is required and only one memory access cycle needs to be executed. The above description applies to memory access requests that have been initiated by the M-Units within a processor cache. It is significant, however, that because the caches associated with individual processors are typically of the write-back type, there is always the possibility that a processor contains data that has been updated within its cache without being written into the corresponding location in memory. In a multiprocessor system, particularly where I/O devices are fairly active, there occasionally arises a request from a system unit for memory data, the most recent version of which resides not within the memory but in some CPU cache. Under these circumstances, the SCU has to insure that the CPU containing the most recent version of data in its cache writes the data back into the corresponding memory location in time for the data to be relayed on to a requesting system unit.

The following is a listing and description of exemplary memory transaction commands that are typically relayed from the SCU to the M-Unit of individual CPUs in detecting and fixing up data inconsistencies or cache conflicts. These commands are designated by specific bit codes in the command field relayed with communication signals between the SCU and the M-Unit. Preferably, the command field is implemented in a form of a 4-bit code so that at least sixteen different memory transaction commands may be defined.

THE GET DATA WRITTEN COMMAND

This is a command from the SCU requiring the addressed CPU's M-unit to relay data existing within its cache to the corresponding location and in system memory while retaining the status of its cache in the written state.

THE GET DATA READ COMMAND

This is a command relayed by the SCU to the M-Unit when data within a CPU cache exists in written form and is also required by another CPU, but for read purposes only. In this case, the SCU requires the first CPU to write a specified block of data from its cache into memory so that the requesting CPU may have read access to it. At the same time, the first CPU is permitted to retain the data within its cache in read status since there is no possibility that a requesting processor may make the data stale by writing to it. As a result, the first CPU, which originally owned data in its cache in a written form, is forced by the SCU now to retain the data only in a read form. Consequently, if the CPU needs to write to this block of data, it has to again acquire permission from the SCU to do so. It will be obvious that in executing these commands, the SCU merely looks up its copy of the CPU cache tag directories by referencing the appropriate cache tag to determine the exact status (invalid, read, written partial, or written full) of the CPU caches involved in a memory access request.

As an illustrative example, when the SCU receives a read refill command request from a processor, say CPU0, for a particular block of memory which, at the time has an invalid status for CPU0. The SCU performs a tag look-up within its cache tag directories and determines that the addressed block is, say, written-full in the cache of another processor CPU1. Consequently, the SCU relays a Get Data Read Command to CPU1 which causes CPU1 to relay the requested data back to the SCU by means of a data write-back operation. At the same time, the SCU changes the status of the data block in the cache of CPU1 to a read state, thereby precluding it from writing to its cache.

The data written back from CPU1 is then relayed through the memory on to the requesting processor CPU0 by means of a write-pass operation in view of the fact that the original status of data in CPU1 was written-full; if, however, the data was originally in written-partial form, then a complete write/read cycle would have to be involved in writing the data to memory and then transferring it to the requesting CPU (as described above in detail). Subsequently, the SCU also changes the status of data within the cache of CPU0 from the original invalid state to a read state. As a result, once the read refill request from CPU0 has been satisfied, both processors CPU0 and CPU1 have their cache status set to a read state.

THE GET DATA WRITTEN COMMAND

This command is best illustrated by a write refill request from CPU0 which has been determined by the SCU, subsequent to its tag look-up cycle, to exist in a written-full state within CPU1. The SCU issues a command to CPU1 (more specifically, a Get Data Invalidate Command) asking CPU1 to relay data from its cache back to SCU while, at the same time, setting the status of the CPU1 cache to the invalid state. Subsequently, the data is relayed back to the CPU0 through a write-pass command. Again, it will be obvious that, if the data in CP01 had been in written-partial form, the memory cycle involved in transferring the data would be a write-read cycle. At the end of the data transaction, the SCU changes the status of the CPU0 cache to written-full.

In the case of a Get Data Written Command involving a data request from an I/O unit, the above procedure essentially applies. However, the request is initiated by the I/O unit in the form of a direct memory access (DMA) read request of the SCU. In this case the SCU directs the target processor CPU1 to write back data from within its cache so that the SCU may subsequently relay it through the memory on to the requesting I/O unit. In this case, however, the cache status of CPU1 is not changed by the SCU since no data inconsistency problems are created by the I/O unit manipulating data that it has requested and received from the SCU. Also, since the concept of caches does not apply to the I/O unit, there is no need for the SCU to monitor or change the cache status of the requesting unit.

THE RETURN DATA READ COMMAND

This command represents the response that the SCU makes to an M-unit when the SCU has data that is requested by a read refill operation ready to be relayed. After the read refill operation has been completed, the SCU places the cache of the target processor in a read state. However, if the original state of the data in the target processor is written-partial, the status of the processor cache is always placed in the invalid state after a Return Data Read Command so as to preclude the possibility of cache conflicts arising from subsequent partial writes or reads to the partially invalid data in the block.

THE RETURN DATA WRITTEN COMMAND

This command is similar to the above command and represents the response by the SCU to a write refill command and is relayed to a target CPU when the requested data is ready to be transferred.

THE OK TO WRITE COMMAND

This command is best illustrated by the situation where a processor CPU1 has a block of data in its cache in a read state and desires to write to the block of data. It needs to obtain the permission of the SCU to do so and, accordingly, issues a write refill request to the SCU. When the SCU performs its tag look up, it notices that CPU1 already has read authorization, and, hence, construes the write refill request as being aimed at obtaining write authorization. In response, the SCU checks to see if there is any immediate cache consistency conflict. If there is no such conflict, no memory cycles are executed and the SCU relays the OK To Write Command to the CPU indicating that it has permission to write to the block. If there is a consistency conflict, the conflict is first resolved and then the OK To Write Command is relayed to CPU1.

THE INVALIDATE READ BLOCK COMMAND

This command is best illustrated by considering the case where CPU1 has a block of data in read state and the SCU receives a write refill request from CPU0, which has its data in a invalid state. Determining this status by performing the tag look up, the SCU sends a command to CPU1 requiring it to change the status of its block from read to invalid. This is because, once the requesting CPU0 has written to the block, the corresponding data in the cache of CPU1 is stale and invalid. Subsequently, the SCU retrieves the requested data from memory and satisfies the write refill command of CPU0, and also changes the status of the CPU0 cache to the written-full state.

THE INVALIDATE WRITTEN BLOCK COMMAND

This is illustrated by considering the case where a processor, say CPU1, has a block of data in written-full state and the SCU subsequently receives a DMA write of a full block (64 bytes) of memory from an I/O unit. When such a request is satisfied, the corresponding block in the CPU cache is rendered stale and, accordingly, the SCU relays a command to CPU1 to invalidate its written block.

In all cases of memory access transactions requiring the Get Data Operation, the SCU initially relays the Get Data Command to the M-Unit of the target processor; however, the SCU does not proceed with reserving the required data path resources at this point. Instead, the reservation of required resources is put off until the target M-Unit returns a Data Ready Command indicating that the requesting data is ready to be transferred. In response to this signal, the SCU relays a Send Data Signal which initiates the write back of data from the target M-unit. At the same time, the SCU initiates a memory cycle by relaying the associated write request. This arrangement frees the SCU, as well as memory and data path resources, from unnecessarily being tied up for the time required for the memory access operation to actually go through subsequent to the initiation of an access request.

It should also be noted that any time a refill request is received, the SCU initiates a memory cycle and proceeds with the tag look-up operation. If no consistency conflict is detected, an acknowledgement is relayed to the memory requiring it to proceed with the memory cycle. However, if a consistency conflict is detected, the SCU relays an Abort signal requiring the memory to abort the previously initiated memory cycle; subsequently, of course, the required fix-up command (one of the various commands discussed above in detail, such as the write-read, or the write-pass commands) is initiated to correct the conflict.

Referring now to FIG. 5 there is shown a block diagram illustrating functional blocks involved in the detection and correction of data inconsistency states or cache conflicts by the SCU in accordance with an illustrative embodiment of this invention. As shown therein, the cache conflict detection arrangement 200 includes arbitration logic 202 adapted to accept a plurality of requests generated by one of the system units and generate therefrom a selected request on the basis of predefined hierarchical algorithm. It should be noted that memory access request generated by a requesting port includes request and associated commands and addresses which are subsequently latched at the corresponding SCU port. In parallel with the arbitration of incoming requests, addresses associated with the requests are received at a group of address buffers 204 whose output is fed to a multiplexer 206.

The arbitrated request from the arbitration logic 202 manifests itself in form of a 5-bit index which is used as the select input for the multiplexer 206 to generate the address corresponding to the selected request. Commands that are associated with incoming requests are received at a group of command buffers 208 the output of which is fed to a command multiplexer 210 which also receives at its select input the 5-bit index defined for the selected request. The address selected by multiplexer 206 is fed to a set of RAMs 207 which generate signals identifying the particular unit, segment, and bank in main memory which corresponds to the selected address.

The outputs of the RAMS 207, the arbitration logic 202 and the command multiplexer 210 are fed to a resources required logic module 212 which is implemented in the form of a table storing a listing of various acceptable requests and accompanying commands and addresses for generating a resources required vector RR at the output which defines all resources required to execute the arbitrated request.

The command buffers 208 and the address buffers 204 serve as means for buffering these signals until the SCU is ready to act upon them. The resources required vector RR is preferably in the form of a 28-bit signal defining in correspondence to each of the bits, a particular resource required for executing the arbitrated request. This vector RR is fed to a resource check logic 214 which also accepts an input from a resource available module 216 which essentially keeps track of the system resources to generate an output indicative of the resources that are available at a given time.

The resource check logic compares the RR vector to the RA vector to determine if the required resources form a subset of the available resources. If it is found that all required resources are in fact available, the resource check logic 214 generates a signal which is fed to a start-up logic 218 which, in turn generates a signal for starting the memory cycle. However, if it is found that all required resources are not available at the time, a signal is sent back to the arbitration logic module 202 to initiate the selection of a new request for arbitration. This signal (designated as "B" in FIG. 5) also indicates to the arbitration logic that the unserviced requests is to be put back into the pool of incoming requests so that it may be considered in subsequent arbitration.

In FIG. 5, if the required resources for a request are found to be available, the start-up logic 218 also initiates the start of the look-up cycle utilized by the SCU to ascertain the status of the addressed section of memory. More specifically, information pertinent to the selected request is placed by the start-up logic 218 within a look-up queue 220 which, according to a preferred implementation, is capable of storing four (4) separate entries at a time. The look-up queue is required in view of the fact that the arbitration logic 202 and the resource check logic 214 are capable of, respectively, selecting a request for arbitration and performing the resource checking comparison at a rate of one transaction per cycle. However, the look-up operations by the SCU require two cycles to be executed. Accordingly, it becomes necessary to maintain a correspondence between the request selection and the look-up operations. The look-up queue 220 provides this function.

When the resource check logic 214 determines that the required resources for a selected request are not available and causes the requests to be returned to the arbitration logic 202, the returned requests may be positioned on a separate reservation list of requests that have previously been returned because corresponding resources were not available. At the same time, request that have been placed at the reservation list may have their non-available resources reserved for them. An exemplary arrangement for performing of the resource generation of vectors and positioning denied requests on a reservation list is described in the above-referenced Flynn et al., application entitled "Method And Means For Arbitrating Communication Requests Using A System Control Unit In A Multi-Processor System", which is incorporated herein by reference.

The information loaded into the look-up queue 220 for a selected request includes the request index and the command field corresponding to the selected command. In other words, the same information that passes to the resource logic 214 gets loaded into the look-up queue 220. Entries in the look-up queue 220 are fed out in chronological order and are relayed to a tag logic module 222 which looks at the information generated as a result of the look-up operation and determines whether or not a fix-up operation is required and produces a signal indicating the same. If no fix-up operation is required, the memory cycle continues and the request is executed. The tag logic module 222 also receives the tag address corresponding to the selected request. The addresses from the buffers 204 are fed to a separate multiplexer 224 and the appropriate tag address determined by the action of the select input of multiplexer 224 is sent to the tag module 222.

The tag logic module 222 generates a signal comprising the tag status for the memory address accompanying the selected request and this information is fed to a microsequencer 226. The information unloaded from the look-up queue 220 is used by the tag logic 222 to perform the required look-up operation and the microsequencer 226 uses the tag status generated by the logic module in combination with signals representing the particular command type associated with the selected request to determine whether or not the SCU needs to perform a fix-up operation. The microsequencer is preferably implemented in microcode and inspects the combined bit fields for the signals fed to it and performs a comparison to prestored values to determine if a cache consistency conflict exists that needs to be fixed-up. The decision made by the microsequencer 226 is based on the various data inconsistency conditions discussed above, particularly in connection with the commands relayed from the SCU to the M-Units. If the microsequencer 226 determines that a fixed-up operation is required, the corresponding fix-up sequence or commands that the SCU needs to relay to the appropriate system units are loaded into a fix-up queue 228. In correspondence to each of the fix-up queue entries, the corresponding set of resources required for executing the fix-up sequence are generated. This is illustrated in FIG. 6 which shows fix-up queue entries 228A, 228B, and 228C being fed to corresponding resources required logic modules 230A, 230B, and 230C, the outputs of which, in combination, form a fix-up resources required vector (FRV). The vector FRV is linked back into the resources checking logic module 214 of FIG. 5 and undergoes a resource checking operation to determine whether the required resources defined by it are in fact available.

As illustrated in FIG. 7, the resource check modules 232A, 232B, and 232C receive the corresponding resources required (RR) vectors F1, F2, and F3 respectively. These vectors are checked against the resources available (RA) vector to generate corresponding "ready" signals if the required resources are found to be a subset of the available resources. The ready signals are subsequently fed as inputs to an OR gate 234 whose output represents the signal for initiating the fix-up sequence. In other words, the above arrangement functions by the provision of predefined fix-up sequences which are to be executed when the existence of other predefined conditions are confirmed. Anytime a look-up operation reveals a cache consistency conflict, the process in question is loaded into the fix-up queue to be executed when the required resources are available. In this manner, when the fix-up operation is ready to be executed, the system microcode may be borrowed (typically for just one borrowed cycle) in order to execute the fix-up sequence. Subsequently, the corresponding fix-up queue entry is cleared and becomes available for a subsequently required fix-up operation. The preferred arrangement of FIGS. 5–7 is shown as having a three-entry deep fix-up queue allowing up to three fix-up sequences to be considered at one time. If additional fix-up sequences are required, the system microcode may be used to independently execute a fix-up sequence.

We claim:

1. In a multi-processor system having a system memory and a plurality of central processor units (CPUs), and CPUs being connected to said system memory, and wherein each CPU includes a respective cache memory for storing data from predefined blocks of memory locations in said system memory, said respective cache memory including storage locations for blocks of data words and associated block addresses and associated block status information indicating whether each block of data words in said respective cache memory has an "invalid" status, a "read" status, a "written-partial" status, or a "written-full" status, and status information indicating whether each word in a "written-partial" block of data words is valid or not, a method for controlling access to said respective cache memory in response to a memory access request from said each CPU, said memory access request specifying a block address of a specified block of data, said method comprising the steps of:

(a) searching said respective cache memory for an associated block address matching said specified block address, and when a matching associated block address is found in said respective cache memory, retrieving the associated block status information for the matching associated block address, and (b1) when said memory access request is a request to read data and a matching associated block address is found in said respective cache memory and the associated status information for the matching associated block address does not indicate an "invalid" status, reading data from said respective cache memory, (b2) when said memory access request is a request to read data and either a matching associated block address is not found in said respective cache memory or a matching associated block address is found in said respective cache memory but the associated block status information for the matching associated block address indicates an "invalid" status, fetching said specified data block from said system memory, writing said fetched data block into said respective cache memory, and setting in said respective cache memory the associated status information for the fetched data block to indicate a "read" status;

(b3) when said memory access request is a request to write specified data to less than a full portion of at least one of said words and a matching associated block address is not found in said respective cache memory or a matching associated block address is found in said respective cache memory but the associated block status information for the matching associated block address indicates an "invalid" status, fetching said specified data block from said system memory, and writing at least a portion of the fetched data block and said specified data into said respective cache memory, and setting in said respective cache memory the associated status information for the fetched data block to indicate a "written full" status;

(b4) when said memory access request is a request to write specified data to a full portion of at least a specified one of said words, and a matching associated block address is not found in said respective cache memory or a matching associated block address is found in said respective cache memory but the associated block status information for the matching associated block address indicates that the block is invalid, writing said specified data into said respective cache memory, setting in said respective cache memory the associated status information for each word in said specified block to indicate that said specified one of said words is valid, and setting in said respective cache memory the associated status information for said specified block to indicate a status of "written partial";

(b5) when said memory access request is a request to write specified data and a matching associated block address is found in said cache memory and the associated block status information for the matching associated block address indicates neither an "invalid" status nor a "written full" status, fetching said specified data block from said system memory, writing at least a portion of the fetched data block and said specified data into said respective cache memory, and setting in said respective cache memory the associated status information for the fetched data block to indicate a "written full" status; and (b6) when said memory access request is a request to write specified data, a matching associated block address is found in said respective cache memory and the associated block status information for the matching associated block address indicates a "written full" status, writing said specified data into said cache memory.

2. The method as claimed in claim 1, further including the step of maintaining in a central directory copies of said cache status information indicating whether the blocks of data words in said cache memories each have a status of "invalid", "read", "written-partial", or "written-full", and when performing said fetching from said system memory during said steps (b3) and (b5) for a write access, accessing said central directory to determine whether another one of said cache memories other than said respective cache memory has a status of "written full" associated with said specified block address, and when said another one of said cache memories has a status of "written full" associated with said specified block address, writing the specified data block in said another cache memory back to said system memory and setting said associated status information in said another cache memory for said specified block address to a status of "invalid".

3. A multi-processor system comprising a system memory connected to a plurality of central processor units (CPUs), wherein each CPU includes a respective execution unit and a respective cache memory including means for storing data from predefined blocks of memory locations in said system memory; said respective cache memory including storage locations for blocks of data words and associated block addresses and associated block status information indicating whether each block of data words in said respective cache memory has an "invalid" status, a "read" status, a "written-partial" status, or a "written-full" status, and status information indicating whether each word in a "written-partial" block of data words is valid or not; said respective cache memory further including means for retrieving a specified data block and status information associated with an associated block address matching a specified block address specified by a memory access request by said respective execution unit of said each CPU; said each CPU further including control means coupled to said respective execution unit, said respective cache memory and said system memory for controlling access to said respective cache memory, wherein said control means includes:

(a) means, responsive to said memory access request when said memory access request is a request to read data and a matching associated block address is found in said respective cache memory and the associated status information for the matching associated block address does not indicate an "invalid" status, for reading data from said respective cache memory, (b) means, responsive to said memory access request when said memory access request is a request to read data and either a matching associated block address is not found in said respective cache memory or a matching associated block address is found in said respective cache memory but the associated block status information for the matching associated block address indicates an "invalid" status, for fetching said specified data block from said system memory, writing said fetched data block into said respective cache memory, and setting in said respective cache memory the associated status information for the fetched data block to indicate a "read" status;

(c) means, responsive to said memory access request when said memory access request is a request to write specified data to less than a full portion of at least one of said words and a matching associated block address is not found in said respective cache memory or a matching associated block address is found in said respective cache memory but the associated block status information for the matching associated block address indicates an "invalid" status, for fetching said specified data block from said system memory, and writing at least a portion of the fetched data bock and said specified data into said respective cache memory, and setting in said respective cache memory the associated status information for the fetched data block to indicate a "written full" status;

(d) means, responsive to said memory access request when said memory access request is a request to write specified data to a full portion of at least one of said words and a matching associated block address is not found in said respective cache memory or a matching associated block address is found in said respective cache memory but the associated block status information for the matching associated block address indicates that the block is invalid, for writing said specified data into said respective cache memory, setting in said respective cache memory the associated status information for each word in said specified block to indicate that said specified one of said words is valid, and setting in said respective cache memory the associated status information for said specified block to indicate a status of "written partial";

(e) means, responsive to said memory access request when said memory access request is a request to write specified data and a matching associated block address is found in said cache memory and the associated block status information for the matching associated block address indicates neither an "invalid" status nor a "written full" status, for fetching said specified data block from said system memory, writing at least a portion of the fetched data block and said specified data into said respective cache memory, and setting in said respective cache memory the associated status information for the fetched data block to indicate a "written full" status; and (f) means, responsive to said memory access request when said memory access request is a request to write specified data and a matching associated block address is found in said respective cache memory and the associated block status information for the matching associated block address indicates a "written full" status, for writing said specified data into said cache memory.

4. The multi-processor system as claimed in claim 3, further including a system control unit coupled between said system memory and said CPUs, said system control unit including a central directory for storing copies of said cache status information indicating whether the blocks of data words in said cache memories each have a status of "invalid", "read", "written-partial", or "written-full", and control means responsive to said fetching from said system memory by said means (c) and said means (e) responsive to a write access request by said each CPU for accessing said central directory to determine whether another one of said cache memories other than said respective cache memory has a status of "written full" associated with said specified block address, and when said another one of said cache memories has a status of "written full" associated with said specified block address, transmitting a command to said another one of aid cache memories for writing the specified data block in said another one of said cache memories back to said system memory and setting said associated status information in said another one of said cache memories for said specified data block address to indicate a status of "invalid".

* * * * *

UNITED STATES PATENT AND TRADEMARK OFFICE
CERTIFICATE OF CORRECTION

PATENT NO. : 5,222,224
DATED : June 22, 1993
INVENTOR(S) : Michael E. Flynn, et al It is certified that error appears in the above-indentified patent and that said Letters Patent is hereby corrected as shown below:

Column 2, line 20, change "306,564" to --306,544--.

Column 24, line 14, change "aid" to --said--.

Signed and Sealed this

Twenty-second Day of March, 1994

Attest:

BRUCE LEHMAN

*Attesting Officer*    *Commissioner of Patents and Trademarks*